United States Patent Office 3,222,248
Patented Dec. 7, 1965

3,222,248
METHOD OF CONTROLLING MICROORGANISMS BY MEANS OF ORGANIC THIOCYANATES
George E. Lukes, Irvington, N.Y., and George P. Willsey, Jr., Houston, Tex., assignors to Stauffer Chemical Company, New York, N.Y., a corporation of Delaware
No Drawing. Filed Dec. 12, 1961, Ser. No. 158,897
7 Claims. (Cl. 167—30)

This invention is concerned with a method of controlling the growth of microorganisms such as fungi, bacteria and the like by means of certain phenacyl thiocyanates. The invention also pertains to the formulation, use and application of microbiocides incorporating as their active constituent at least one of the aforesaid phenacyl thiocyanates.

The present invention is predicated on the finding that certain organic thiocyanates which are characterized by the presence of both a keto and a thiocyanate function exhibit a high degree of biocidal activity and are especially effective in controlling the growth of microorganisms such as fungi, bacteria and the like. It is accordingly a primary purpose and object of this invention to provide a method for controlling microorganisms by means of the aforementioned organic thiocyanates. It is a further object of the invention to provide microbiocidal compositions containing as the active principal thereof at least one of the aforementioned organic thiocyanates. Other objects and purposes will become manifest as the description proceeds.

The dual function thiocyanates which are suitable for controlling microorganisms as above described can be generally depicted by the following formula:

$$R_1-\underset{R_2\ R_3}{\underset{|}{\bigcirc}}-CO-CH_2-SCN$$

wherein at least one of $R_1$, $R_2$ and $R_3$ designates hydrogen; a lower alkyl radical e.g. methyl, ethyl, n-propyl, isobutyl, n-butyl, sec-butyl and the like; an isothiocyanate radical, an amino group or a nitro group.

Examples of structures included within the ambit of the general formula include the following lists of compounds:

Compound 1:

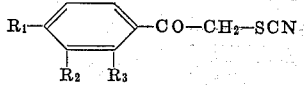

Compound 2:

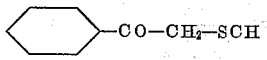

Compound 3:

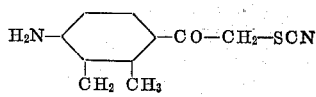

Compound 4:

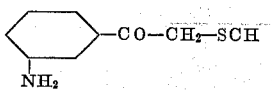

Compound 5:

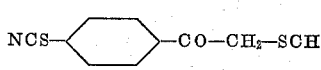

Compound 6:

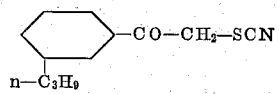

Compound 7:

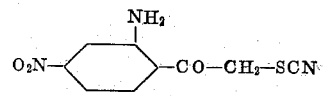

Compound 8:

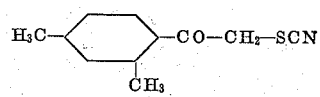

Compound 9:

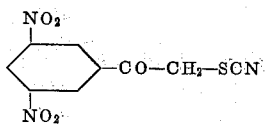

Compound 10:

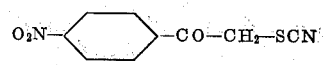

Compound 11:

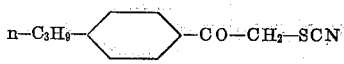

Compound 12:

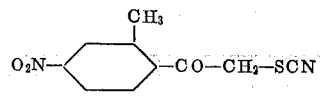

Compound 13:

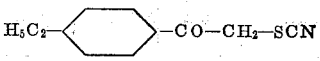

Compound 14:

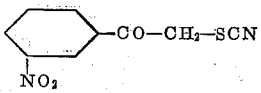

Compound 15:

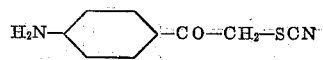

Compound 16:

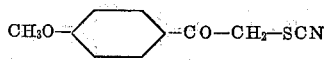

Compound 17:

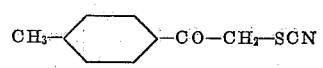

Certain of the thiocyanates as contemplated herein are known entities, the description and preparation of which may be found in the chemical literature. In general, these compounds are formed by reacting a phenacyl halide bearing the appropriately substituted aromatic ring with an alkali metal thiocyanate. A typical synthetic procedure comprises refluxing an alcoholic solution of the requisite phenacyl halide with an excess of potassium thiocyanate. For further details concerning the reaction, reference is made to C.A. 48, 11347c (1954) and C.A. 42, 2387 (1948).

In using the isothiocyanate toxicants as contemplated herein, it is merely necessary to contact the toxicant with the microorganism, the growth of which it is desired to control. This can be accomplished by various techniques and procedures which are commonly employed in the pesticidal art. For instance, in vitro tests were conducted to measure the fungitoxicity of the herein contemplated toxicants when placed in contact with growing fungus or bacteria. In this procedure 1 oz. bottles are partially filled with 10 ml. of malt or nutrient broth and capped with aluminum foil, sterilized and maintained for the test. A compound is then injected by means of a syringe through the foil and into the broth followed by inoculation with a water suspension of spores. The bottles are sealed and held for one week before the results are evaluated.

A foliage fungicide test is conducted in order to ascertain the protectant action as well as eradicant and leaf systemic action of the test compounds. The particular type of action which is produced by the test compound is determined by evaluation tests. Pinto bean plants are sprayed with various concentrations of the toxicant and, after drying, the plants are inoculated with bean rust or powdery mildew spores. Rust infection requires an overnight treatment in a moisture chamber following inoculation.

Weathering tests were carried out for the purpose of determining how long the compound remained in contact with the plant. Toxicants which are volatile or undergo hydrolytic reactions or otherwise become inactivated are not suitable as commercial fungicides. Tests to determine the weathering qualities of the herein contemplated toxicants were carried out in a humidity or moisture chamber in which pinto bean plants inoculated with rust or powdery mildew are sprayed with the particular compound under test. The length of time of the test comprises 2 days and 2 nights in the moisture chamber.

The results of carrying out the above described tests, using the thiocyanate toxicants of this invention, are reported in the table below.

wherein $R_1$, $R_2$ and $R_3$ are selected from the class consisting of hydrogen, lower alkyl thiocyanate, amino and nitro.

2. A method of inhibiting the growth of microorganisms which comprises applying thereto a small but effective amount of a phenacyl thiocyanate of the following formula:

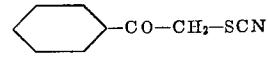

3. A method of inhibiting the growth of microorganisms which comprises applying thereto a small but effective amount of a phenacyl thiocyanate of the following formula:

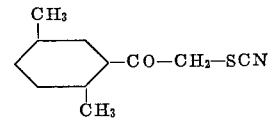

4. A method of inhibiting the growth of microorganisms which comprises applying thereto a small but effective amount of a phenacyl thiocyanate of the following formula:

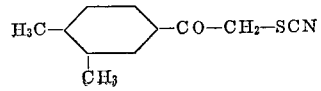

Table

| Compound | In vitro | | Foliage tests | | | | Weathering | | Tomato grey leaf spot |
|---|---|---|---|---|---|---|---|---|---|
| | Aspergillus niger | Penicillium | P.p.m. | Bean rust | Bean Mildew | N. corn leaf blight | Rust | Mildew | |
| 1 | >500 | >500 | 100 | | | | | | |
| | | | 500 | +++ | ++++ | ++++ | | | |
| | | | 1,000 | ++++ | 100 | 100 | +++ | | |
| 4 | (50) | (50) | 100 | ++++ | | ++++ | | | +++ |
| | | | 500 | 100 | | 100 | ++++ | | ++++ |
| | | | 1,000 | 100 | ++++ | 100 | 100 | +++ | ++++ |
| 6 | >50 | >50 | 100 | | +++ | +++ | | | +++ |
| | | | 500 | | +++ | +++ | | ++++ | +++ |
| | | | 1,000 | +++ | +++ | +++ | ++++ | +++ | ++++ |
| 8* | | | 100 | | | | ++++ | ++++ | ++++ |
| | | | 500 | 100 | 100 | 100 | ++++ | 100 | ++++ |
| | | | 1,000 | 100 | 100 | 100 | 100 | | |
| 10 | >500 | >500 | 100 | +++ | | | | | |
| | | | 500 | 100 | | ++++ | +++ | | |
| | | | 1,000 | 100 | +++ | 100 | ++++ | | |
| 13 | (50) | (50) | 100 | | +++ | +++ | | | |
| | | | 500 | ++++ | +++ | ++++ | ++++ | ++++ | |
| | | | 1,000 | ++++ | 100 | ++++ | ++++ | ++++ | |
| 14 | >50 | >50 | 100 | +++ | | | | | |
| | | | 500 | ++++ | | +++ | | | |
| | | | 1,000 | ++++ | | +++ | | | |
| 15 | (50) | (50) | 100 | +++ | | +++ | | | +++ |
| | | | 500 | ++++ | | +++ | | | +++ |
| | | | 1,000 | ++++ | | 100 | ++++ | | ++++ |
| 16 | 25 | (25) | 100 | +++ | +++ | ++++ | | | |
| | | | 500 | 100 | +++ | ++++ | ++++ | | |
| | | | 1,000 | 100 | +++ | ++++ | 100 | | ++++ |
| 17 | 50 | (50) | 100 | +++ | +++ | | | | +++ |
| | | | 500 | 100 | 100 | ++++ | | | +++ |
| | | | 1,000 | 100 | 100 | 100 | ++++ | +++ | ++++ |

*The activity of Compound 8 was determined by the agar plate test. This procedure consists of placing 0.1 g. of the compound in a 0.5 ml. micro beaker which is then inserted in a petri dish of hardened potato dextrose agar. The microorganism spores are dusted over the agar surface and after approximately 1 week the growth of the fungus is observed and the results recorded as percent control. The following data was obtained using Compound 8: *Staphylococcus aureus*, 100 p.p.m.; *Erwinia amylovora*, 500 p.p.m.; *Escherichia coli*, >500 p.p.m.
100=no pustules or mildew. ++++=75 to 100% control. +++=50 to 74% control.
Numbers in parentheses indicate partial fungus inhibition at that concentration in p.p.m.

We claim:
1. A method of inhibiting the growth of microorganisms which comprises applying thereto a small but effective amount of a phenacyl thiocyanate represented by the following formula:

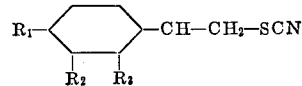

5. A method of inhibiting the growth of microorganisms which comprises applying thereto a small but effective amount of a phenacyl thiocyanate of the following formula:

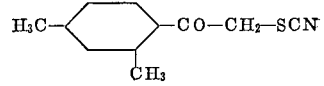

6. A method of inhibiting the growth of microorganisms which comprises applying thereto a small but effective amount of a phenacyl thiocyanate of the following formula:

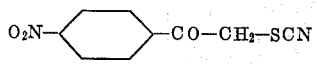

7. A method of inhibiting the growth of microorganisms which comprises applying thereto a small but effective amount of a phenacyl thiocyanate of the following formula:

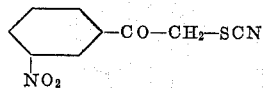

References Cited by the Examiner

UNITED STATES PATENTS

| | | | |
|---|---|---|---|
| 2,213,216 | 9/1940 | Hester | 167—30 |
| 2,462,433 | 2/1949 | Searle | 260—454 |
| 2,923,658 | 2/1960 | Regel et al. | 167—30 |
| 2,965,537 | 12/1960 | Rosen | 167—30 |
| 3,085,045 | 4/1963 | Lukes et al. | 167—30 |
| 3,097,130 | 7/1963 | Regel et al. | 167—30 |

OTHER REFERENCES

C.A., volume 42 (1948), pages 2386–2387.

Grove et al.: App. Biol., vol. 34, No. 8, September 1946, pp. 113–124.

JULIAN S. LEVITT, *Primary Examiner.*

MORRIS O. WOLK, LEWIS GOTTS, *Examiners.*

UNITED STATES PATENT OFFICE

CERTIFICATE OF CORRECTION

Patent No. 3,222,248                              December 7, 1965

George E. Lukes et al.

It is hereby certified that error appears in the above numbered patent requiring correction and that the said Letters Patent should read as corrected below.

Column 1, lines 46 to 48, for that portion of Compound 1 reading "-SCH" read -- -SCN --; lines 50 to 53, for that portion of Compound 2 reading "$\overset{|}{C}H_2$" read -- $\overset{|}{C}H_3$ --; same column 1, lines 55 to 58, for that portion of Compound 3 reading "-SCH" read -- -SCN --; column 3, lines 72 to 75, for that portion of the formula reading "-CH-" read -- -CO- --.

Signed and sealed this 27th day of September 1966.

(SEAL)
Attest:

ERNEST W. SWIDER                                  EDWARD J. BRENNER
Attesting Officer                                      Commissioner of Patents